Feb. 7, 1950  L. L. SALFISBERG  2,496,753
METHOD OF MAKING RECTANGULAR FLAT BAGS
Filed Feb. 6, 1946
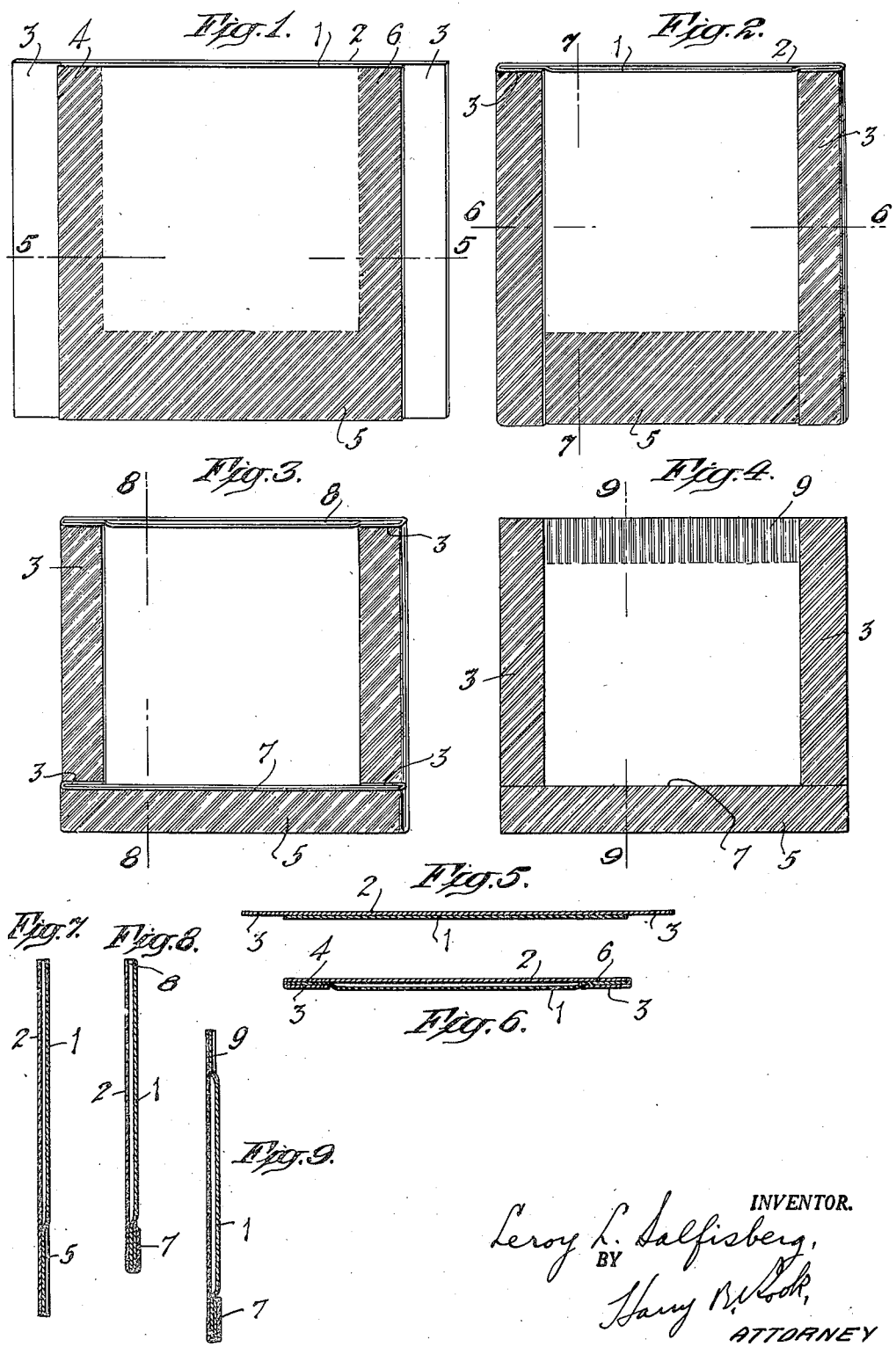
INVENTOR.
Leroy L. Salfisberg,
BY
Harry B. Rook,
ATTORNEY Patented Feb. 7, 1950

2,496,753

UNITED STATES PATENT OFFICE 2,496,753

METHOD OF MAKING RECTANGULAR FLAT BAGS

Leroy L. Salfisberg, South Orange, N. J., assignor to Ivers-Lee Company, Newark, N. J., a corporation of Delaware Application February 6, 1946, Serial No. 645,757

1 Claim. (Cl. 93—35)

This invention relates in general to packages or bags formed of a plurality of thin flexible layers of material sealed together in opposed relation to each other in zones forming and bounding a compartment between the layers for the substance being packed. More particularly, the invention contemplates a bag type of package which is initially formed with one side or edge open to form a mouth through which the substance to be packaged may be inserted. Further, the invention contemplates especially bags formed of thin transparent material such as "cellophane," rubber hydrochloride and the like.

Heretofore, in the manufacture of bags of this general type, the sealed zones or seams have not been as strong and as resistant to breaking as is desired, and where it has been attempted to increase the strength of the seams by multiple folding, undesirable thicknesses are encountered at the seams, as well as undesirable rigidity and the difficulty of causing the various superposed folds to remain sealed together during handling and use of the package.

Therefore, one object of my invention is to provide a package or bag of the general character described in which the layers shall be sealed together in a novel and improved manner to ensure security and flexibility at the seams as well as a minimum number of layers or thicknesses of the material.

Another object is to provide such a package which shall be so constructed that there shall be substantially the same number of layers or thicknesses of material at all seams during any one sealing operation, whereby to ensure uniform pressure on the layers and consequent uniform sealing throughout the seams.

Other objects, advantages and results of the invention will be brought out by the following description in conjunction with the accompanying drawing in which Figure 1 is a perspective plan view of two layers of material which have been sealed together during the first step of the method of forming a bag in accordance with the invention.

Figure 2 is a similar view showing the condition of the layers at the end of the second operation in forming the package.

Figure 3 is a perspective plan view of the completed bag ready for insertion of the contents.

Figure 4 is a plan view showing the mouth of the bag sealed for enclosing the contents within the bag.

Figure 5 is a horizontal sectional view on the line 5—5 of Figure 1.

Figure 6 is a similar view on the line 6—6 of Figure 2.

Figure 7 is a transverse vertical sectional view on the line 7—7 of Figure 2.

Figure 8 is a similar view on the line 8—8 of Figure 3, and

Figure 9 is a like view on the line 9—9 of Figure 4.

Specifically describing the illustrated embodiment of the invention, the bag or package is composed of two layers 1 and 2 of suitable packaging material such as "cellophane" or "Pliofilm" otherwise known as rubber hydrochloride, which are adapted to be sealed together in opposed relation to each other to form the opposed side walls of a substantially flat package. As shown, one of the layers, in this instance the layer 2, is wider than the layer 1 and the layer 1 is superimposed on the layer 2 with its long edges disposed inwardly of the corresponding edges of the layer 2 so that the marginal portions of the layer 2 project beyond the corresponding edges of the layer 1, as indicated at 3.

As shown, the layers are rectangular in plan, and in the initial sealing step, the layer 1 is sealed to the layer 2 along three margins, as indicated at 4, 5 and 6, the sealed zones 4 and 6 constituting the side seams of the package and the zone 5 forming the bottom of the package. This sealing may be effected in any suitable manner, for example by adhesive or by thermoplastic coatings between the contacting surfaces of the two layers, and preferably the sealed zones are corrugated or otherwise crimped to more firmly secure the layers together.

The second sealing step consists in turning the projecting margins 3 of the sheet 2 inwardly over the zones 4 and 6 and sealing said marginal portions 3 to the exposed side of the layer 1, as shown in Figure 2.

It will be noted that the zone 5 is substantially wider than the zones 4 and 6 and the next step in the method of forming the package consists in folding the layers along the zone 5 approximately midway of the width thereof to form a bottom flap 7 which is sealed to the outer surface of the layer 1 and to the inturned marginal portions 3 of the layer 2, as shown in Figure 3.

This leaves the bag with an opening 8 between the marginal portions of the layers opposite the bottom of the bag, as indicated at 8, to serve as a mouth for feeding the bag. After the substance to be packaged has been inserted through said mouth, the layers 1 and 2 are sealed together as indicated at 9 in Figure 4 to close the mouth and securely seal the substance being packaged within the bag. Should it be desired, the sealed portion 9 could be folded inwardly and sealed against the outer side of the layer 1 in the same manner that the flap 7 is folded and sealed to form the bottom of the bag.

It will be noted that in the main sealing operation shown in Figure 1 there are the same number of layers at all of the sealed zones 4, 5 and 6, while during the sealing operation illustrated in Figure 2, there are the same number of layers along the side seams of the package formed by the marginal portions 3 of the layer 2 turned inwardly over the zones 4 and 6. Moreover, the folds at the side seams and bottom seam provide high resistance to pressure from the contents of the package and also eliminate the raw edges of the layers at the seams which might become caught in exterior objects and thus torn or damaged.

Various modifications in the steps of the method and the structure of the package will occur to those skilled in the art as within the spirit and scope of the invention.

I claim:

The method of making a rectangular flat bag including the steps of forming two sheets of flexible heat sealable material of the same length but of different widths, superimposing the narrower sheet on the other with the longitudinal marginal portions of the wider sheet extending beyond the corresponding edges of the narrower sheet, simultaneously subjecting only the longitudinal marginal zones and one transverse marginal zone of the narrower sheet to heat and pressure to seal said sheets directly together along said marginal portions, thereafter folding said longitudinal marginal portions of the wider sheet inwardly around the corresponding edge and over the exposed side of the narrower sheet, and then subjecting the sheets to heat and pressure along said longitudinal marginal portions to seal the latter to said exposed side of the narrower sheet.

LEROY L. SALFISBERG.

REFERENCES CITED

The following references are of record in the file of this patent:

UNITED STATES PATENTS

| Number | Name | Date |
|---|---|---|
| 917,124 | Peirson | Apr. 6, 1909 |
| 2,062,265 | Haskill | Nov. 24, 1936 |
| 2,090,308 | Potdevin | Aug. 17, 1937 |
| 2,283,069 | Knuetter | May 12, 1942 |
| 2,344,369 | Salfisberg | Mar. 14, 1944 |
| 2,350,132 | Rohdin | May 30, 1944 |

FOREIGN PATENTS

| Number | Country | Date |
|---|---|---|
| 1,335 | Great Britain | 1874 |